F. DIEHL.
WINDING MACHINE.
APPLICATION FILED MAY 19, 1914.

1,370,744.

Patented Mar. 8, 1921.
4 SHEETS—SHEET 3.

Witnesses:

Inventor
Frederick Diehl
By his Attorney

F. DIEHL.
WINDING MACHINE.
APPLICATION FILED MAY 19, 1914.

1,370,744.

Patented Mar. 8, 1921.
4 SHEETS—SHEET 4.

Witnesses:

Inventor
Frederick Diehl
By his Attorney

UNITED STATES PATENT OFFICE.

FREDERICK DIEHL, OF ELIZABETH, NEW JERSEY, ASSIGNOR TO DIEHL MANUFACTURING COMPANY, OF ELIZABETH, NEW JERSEY, A CORPORATION OF NEW JERSEY.

WINDING-MACHINE.

1,370,744.  Specification of Letters Patent.  Patented Mar. 8, 1921.

Application filed May 19, 1914. Serial No. 839,488.

*To all whom it may concern:*

Be it known that I, FREDERICK DIEHL, a citizen of the United States, residing at Elizabeth, in the county of Union and State of New Jersey, have invented certain new and useful Improvements in Winding-Machines, of which the following is a specification, reference being had therein to the accompanying drawings.

This invention relates to winding machines.

It is particularly applicable to machines for winding coils for the poles of dynamo electric machines although it may be advantageously used in other relations.

Heretofore it has been the ordinary practice to wind the coils either manually directly upon the poles, or separately by hand or on a machine and then apply them bodily upon the poles.

Hand winding is slow and requires skilled labor. The application of separately or independently formed coils, whether hand or machine wound, requires skilful and careful manipulation, both in the placing of the coils and in their connections. The difficulties experienced in such practice are particularly numerous and objectionable where the coils must be placed in relatively narrow slots in the dynamo electric machine frame.

An object of the present invention is to provide a machine by which the coils may be wound automatically and directly upon the poles.

Other objects are to increase the speed and decrease the cost over hand winding.

Another object is to reduce the number of defective and incorrectly connected coils.

Other objects and advantages will hereinafter appear.

In accordance with this invention the dynamo electric machine frame and the conductor forming the coils are moved relatively to each other and the movements are compounded to produce the coils or winding automatically and directly upon the poles.

An embodiment of the invention is illustrated in the accompanying drawings.

The views in the drawings are as follows: —Figure 1 is a front elevation of a core-winding machine embodying the present invention, and Fig. 1ª a detail elevational view of the winder-reciprocating mechanism. Fig. 2 is a top plan view, Fig. 3 a bottom plan view and Fig. 4 a rear end view of the machine. Fig. 7 is a detail view of one of the coil-confining guard-fingers. Fig. 7ª is an enlarged detail view of a portion of a stator-core with one of the guard-fingers applied thereto.

The machine is shown constructed with a rectangular table 1 supported by the legs 2. Depending from the table are the spaced hangers 3 and 4 affording bearings for the transverse main-shaft 5 which is provided with the grooved pulley 6 to which the driving power is applied by means of a surrounding belt. Mounted in the bearing members 7 and 8, also depending from the table, is the longitudinally extending cam-shaft 9 which is connected by means of the intermeshing bevel-gears 10 and 11 with the main-shaft 5.

Secured upon one end of the table is a standard 12 having a bearing boss 13 in which is journaled the oscillatory shaft 14 having secured upon its inner end by means of the pin 15 the collar 16 sustaining by means of the arms 17 the segmental work-holder 18 formed with the channel 19 concentric with the shaft 14 and conforming with the exterior of the stator-core which it is adapted to fit. The work-holder 18 has upon each of its opposite faces and at opposite sides of its axis a tubular socket 20 in the inner end of which is fitted a plunger-pin 21 with its stem 22 passed through the apertured opposite end of the socket and provided with a button 23 by which it may be retracted in opposition to the surrounding spring 24 interposed between the inner end of the socket and the body of the plunger-pin. The plunger-pins 21 normally project into the channel 19 of the work-holder and in practice enter apertures in the core to be wound which is thus locked in position within the work-holder.

The work-holder rock-shaft 14 has secured thereon at the opposite end of the bearing boss 13 the hub 25 of a depending crank-arm 26 formed with a slot 27 which is entered by a stud-pin 28 having the collar 29 adapted to be clamped upon the inner face of the crank-arm 26 by means of the nut 30 applied to the threaded outer portion of the stud-pin and having the knurled head or hand-wheel 31 and the washer 32 interposed between said nut and the outer face of the crank-arm. The crank-arm is provided in its outer face with a series of notches 33 adapted to be entered by the V-shaped transverse rib 34 of the washer 32 to locate the stud-pin in certain fixed positions upon the crank-arm.

The inner end of the stud-pin 28 adjacent the collar 29 enters a slot 35 in one arm 36 of an elbow-lever mounted upon the fixed fulcrum-stud 37 and having a shorter arm 38 carrying a stud-pin 39. The stud-pin 39 enters the slot 40 in a lateral arm 41 of a rocking yoke 42 mounted upon the fixed fulcrum-stud 43 with its spaced members 42' embracing the triangular cam 44 fixed upon the cam-shaft 9. The cam 44 is of a well-known form and is shaped to produce to-and-fro operative movements of the yoke 42 with intervals of rest, such rocking movements being communicated through the described connections to the work-holder 18. The position of the stud-pin 28 relative to the rock-shaft 14 determines the amplitude of rocking movement of the work-holder under the uniform operation of the yoke 42 imparted by the cam 44.

Sustained upon and centrally of the table 1 above the main-shaft and secured in position by bolts 45 passing through the flanges 46 thereof is the bearing block 47 provided in its upper end with a longitudinal channel 48 closed at the top by means of the cap-plate 49 secured in position by screws 50. Within the channel 48 is slidingly fitted the reciprocating bar 51 formed with the depending forked lug 52 working in a well 53 beneath the channel 48. The aperture of the lug 52 is entered by the rounded extremity 54 of a vibratory lever 55 fulcrumed upon the stud-screw 56 of the bearing member 4'.

The lever 55 is formed near its lower end with a boss 57 having the slot 58 which is entered by the laterally extending pin 59 of an intermediate lever 60 which is fulcrumed upon the screw-stud 61 sustained by the bearing block 47 and is itself formed intermediate its ends with a boss 62 having the slot 63. The slot 63 is entered by a stud 64 carried by an upwardly extending arm 65 of a rocking yoke 66 mounted upon the fulcrum-stud 67 and embracing between its spaced arms the triangular cam 68 fixed upon the main-shaft 5.

The intermittent rocking movements of the yoke 66 derived from the cam 68 are transmitted to the intermediate lever 60 and from it to the lever 55. By reason of the connection of the levers 60 and 55 nearer the fulcrum of the latter than its connection with the bar 51, said bar receives a comparatively long reciprocatory movement from the short operative movements imparted by the cam 68.

The bar 51 sustains upon its advance end the lateral screw-stud 69 upon which is fulcrumed intermediate its ends a rock-lever having a forwardly extending arm 70 provided at its extremity with the bell-mouthed wire-guiding nipple 71 and a rearwardly extending arm 72 formed with the arched cam-slot 73 entered by the fixed screw-stud 74 projecting from the side of the bearing block 47. As the rock-lever 70 72 is moved endwise by the reciprocating bar 51 upon which it is fulcrumed, it derives from the fixed stud 74 and the cam-slot 73 rocking movements in a path transverse to the holder 18 in such manner that the depending mouth of the wire guide assumes its lower positions at opposite sides of the holder and its elevated position while passing across the holder.

By this means the wire-guide or carrier is caused to lead the wire from one extreme position adjacent the bottom of one of the core-interstices upwardly above the core-teeth and across the core to extreme lower position at the opposite side of the core, thus leading a wire through the lower portion of the interstice in lateral register with its path of movement. During this travel or stroke of the wire-guide the core-holder remains stationary, but at the completion of such movement, the guide remains immovable while the holder performs its side-shift movement to bring another core-interstice into register with the guide, after which the guide performs its retrograde movement or stroke in a manner similar to that before described and thereby leads the wire across the core in a path laterally spaced relatively to the initial path of movement although the guide has executed both strokes in the same line. At the completion of such traversing movement of the wire-guide and while the latter remains stationary, a reverse shift movement is given to the carrier to bring the first core-interstice again in register with the wire-guide to receive the succeeding turn of the coil.

As represented in the drawings, the stator-core is formed with the annular body $a$ with the inwardly extending teeth $b$ having at their extremities the laterally extending lips $c$, the adjacent faces of the teeth being covered by the insulating strips $d$. The body $a$ is shown provided in its side faces with the apertures $e$ arranged a quadrant apart to receive the plunger-pins 21 of the work-holder by means of which the core is correctly located and detachably secured within the latter for the winding operation.

Secured upon the end of the table 1 opposite the work-holder are the bracket-pieces 75 formed in their upper edges with notches 76 to receive the opposite ends of the spindle 77 formed with an enlargement 78 serving as a support for the hub of the spool 79 carrying the supply of wire. The spindle is provided adjacent one of the bracket-pieces 75 with the friction-pulley 80 upon the rim of which rests the flat brake-spring 81 having its foot 82 secured upon the table-top by means of screws 83. The spring 81 is apertured intermediate its ends to receive the shank of a screw 84 tapped into the top of the table and provided with a head 85 whose pressure upon the top of the spring is adjusted by turning the screw to vary the pressure of the friction-pad 81' upon the pulley 80 to impose a yielding resistance upon the wire $w$ drawn from the spool. To insure against the fouling of the wire drawn from the spool the spaced rods 86 are normally arranged intermediate the spool-flanges and slightly above the wire wound thereon, these rods being mounted in a tilting block 87 fulcrumed at 88 upon the bearing block 89 secured upon the top of the table. The rods 86 are shown in dotted lines in Fig. 1 elevated suitably for insertion or removal of the spool, which is frictionally mounted upon the portion 78 of the spindle 76. These rods constitute guards for preventing any loose coils of wire resulting from the abnormal unwinding of the spool from getting over the spool flanges and their entanglement with the spool-support.

Rising from the top of the table is the standard 90 provided with the lateral stud-screw 91 upon which is journaled the grooved guide-roller 92 over which the wire is led and beneath a similar guide-roller 93 mounted upon the screw-stud 94 of a post 95 fixed in the rearward end of the bar 51. This bar has secured thereon adjacent the post 95 the foot 96 of a spring take-up arm 97 carrying at its free end the screw-stud 98 upon which is journaled the grooved guide-pulley 99 over which the wire is led from the pulley 93 beneath the guide-pulley 100 which is journaled upon the stud-screw 101 of the post 102 having its foot 103 secured by screws 104 upon the forward arm of the rock-lever 70 72 slightly beyond the fulcrum-stud 69. Adjacent the pulleys 92 and 99 are secured upon their respective supports the guards 92' and 99' for preventing the displacement of the wire running over said pulleys.

The rock-lever arm 70 carries adjacent its forward end the standard 105 provided with the screw-stud 106 upon which is journaled the grooved guide-pulley 107 so located that the forward side of its groove is in substantial alinement with the wire-guiding nipple 71, whereby the wire led beneath the pulley 100 and over the pulley 107 is directed downwardly through the nipple from which it is led to the coils around the teeth of the stator-core.

Figures 1, 4A, 7, 7A:
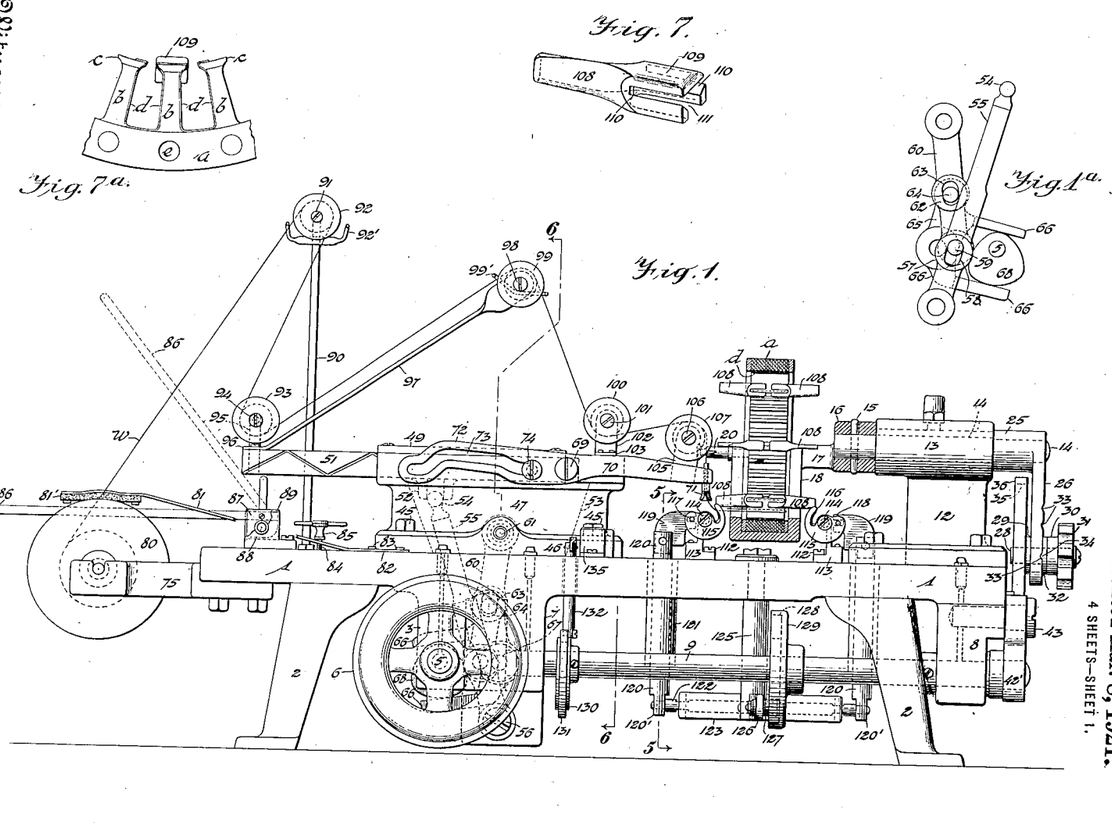
Figure 3:
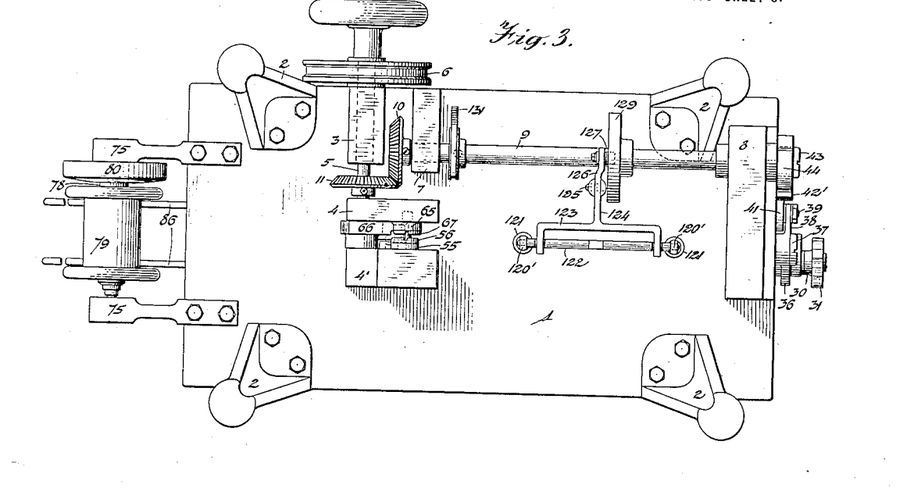

Preparatory to insertion of the core in the work-holder, the central tooth of each section has preferably applied thereto a guard-finger 108 having at one end an enlargement 109 provided with a transverse slot 110 and with an intersecting slot 111 intermediate the side faces thereof, as represented in Fig. 7. One of these guard-fingers is applied to each end of the core-tooth, the slotted portion 109 being formed to closely fit the insulating covering upon the lateral lips $c$, as represented more particularly in Fig. 7$^a$. In the operation of the winding mechanism, the wire is led beneath the projecting portions of these fingers and around the tooth to which they are applied or the adjacent teeth, depending upon which section of the coil is being wound, the fingers confining the individual turns to their respective core-teeth in such operation.

Secured upon the table-top upon opposite sides of the work-holder by means of screws 112 are the brackets 113 provided with the lateral stud-screws 114 upon which are journaled the rocking sectors 115 provided with the upwardly extending concentric loop-detaining fingers 116. The sectors 115 are connected in pairs by the cross-pins 117 so that the fingers 116 of each pair receive rising and falling movements in unison.

Each of the pins 117 is embraced by the forked lateral extension 118 of a plate 119 secured in the upper end of a plunger-bar 120 journaled in the vertical bearing sleeve 121 depending from the table 1.

The reduced and apertured lower ends 120' of the plunger-bars 120 are connected by the cross-rod 122 which is mounted in the yoked extremity 123 of one arm 124 of a rock-lever fulcrumed upon the post 125 depending from the table and having a second arm 126 which carries a roller-stud 127 entering a cam-groove 128 of the cam-disk 129 mounted upon the cam-shaft 9. By the described connections, the cam 129 imparts to the sectors 115 carrying the detaining fingers 116 two oscillatory movements for each rotation of the cam-shaft and consequently for each cycle of movement of the wire-guide 71.

The cam-shaft 9 has mounted thereon an eccentric 130 which is embraced by a yoke 131 secured upon the lower end of the plunger-bar 132 journaled in a bearing aperture extending through the table. The plunger-bar is pivotally connected at its upper end with a crank-arm 133 secured upon the rock-shaft 134 of a counting device 135 of well-known construction (see particularly Fig. 2), which is adapted to indicate the number of revolutions of the cam-shaft in producing the component sections of the compound coils applied to the core-teeth.

Figure 4:
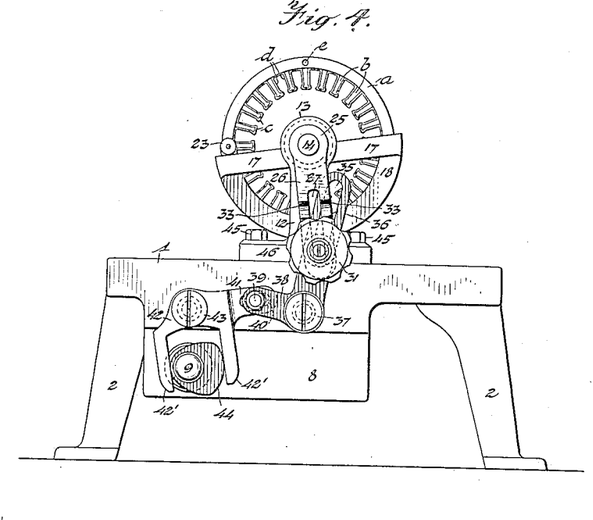
Figure 5:
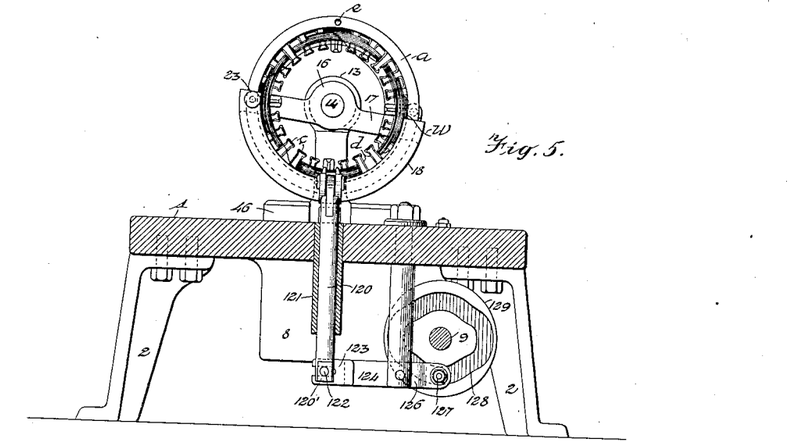
Fig. 5 is a transverse section on the line 5—5 of Fig. 1, looking toward the work-support.
Figure 6:
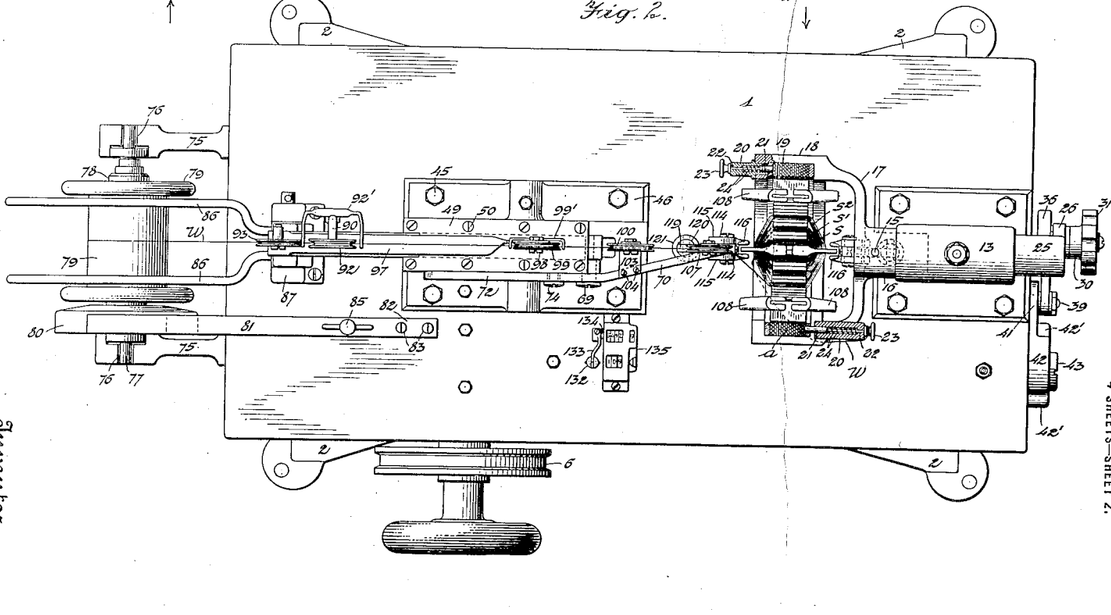
Fig. 6 is a similar section on the line 6—6 of Fig. 1 looking in the opposite direction.

In the use of the machine, a stator-core is prepared for the winding operation by application of insulating strips *d* upon the faces of the recesses or interstices between the teeth, and the core is then introduced in the open channel of the work-holder, the plunger pins having been previously withdrawn and inserted within opposite apertures *e* of the core, as represented in Figs. 2 and 4. The end of the wire *w* having been secured to some part of the holder, such as button 23 of one of the plunger-pins, as indicated in Fig. 2, the machine is set in operation.

In the advance or forward stroke of the wire-guide 71, with the traveling rock-lever 70 72, it carries the wire through the interstice between the central core-tooth of the core-section to be wound and the adjacent tooth and pauses in its advance position for a lateral movement of the work-holder to bring into register therewith the interstice upon the opposite side of the central tooth, after which the wire-guide performs its arched retrograde movement or return stroke in a parallel path relatively to the holder, and during its subsequent pause the work-holder is restored to initial position with the first interstice in register with the guide, thus completing a winding cycle and the first turn of the coil around the initial core-tooth. In this action, the guard-fingers 108 serve to confine the wire below the extremity of the core-tooth and in the subsequent winding cycles to cause the piling up and radial distribution of the individual turns around such initial tooth.

In practice the action of the brake-shoe 81 upon the pulley 80 is such as to permit the unwinding of the spool 79 with just sufficient resistance to provide the requisite tension upon the wire, but to compensate for the inertia of the spool and the contained mass of wire, the spring take-up arm 97 is provided. In the comparatively quick movements of the wire-guide 71, a supply of the wire intermediate the same and the spool is delivered rapidly, thereby drawing down the guide-pulley 99 and the supporting take-up arm which serves to maintain the wire taut and produce a yielding pull upon the spool to cause the gradual unwinding of the same and insure against breakage by excessive and abrupt strains upon the wire. As the spool slowly unwinds, the take-up arm obviously rises to draw in the slack which is given up under the succeeding operative movement of the wire-guide.

During the winding of the initial coil-section as thus described, the stud-pin 28 of the work-holder actuating device is in a position corresponding with the lower notch 33 of the crank-arm 26, as represented in Fig. 1, for production of the shortest throw of the work-holder. At the completion of the desired number of turns for this core-section, as indicated by the revolution-counter 135, the machine is stopped and the stud-pin 28 is shifted to a position corresponding with the intermediate notch 33 of the crank-arm 26, whereby the work-holder derives from the cam 44 rocking movements corresponding in amplitude with the spacing apart of three core-teeth, and the operation of the machine resumed for production of the second coil-section surrounding the core-teeth adjacent the initial tooth.

While the work-holder has a small range of lateral movement relatively to the path of movement of the wire-guide, the guard-fingers 108 maintain substantially their lowest position and serve to confine the successive turns of wire upon the initial core-tooth; but as the amplitude of rocking movement of the work-holder is increased, the guard-fingers assume more elevated positions in their arc of movement, and to compensate for this, the detaining fingers 116 are employed.

The path of movement of the wire-guide is in a plane intermediate the detaining fingers of each pair, the extreme positions of the mouth of the wire-guide being below the upper extremities of such detaining fingers. As the guide reaches its extreme advance and retracted positions, the wire leading therefrom, under the increased lateral movement of the work-holder and the core sustained thereby, is drawn laterally into contact with one of said fingers, and slips down into the throat of the same so as to bring the lead of the wire to a point near the base of the extreme core-tooth to be wound.

As the wire-guide begins its return movement after such engagement with the detaining finger, the latter under the action of its actuating cam 129 is retracted downwardly so as to release the wire-loop engaged by the same and permit it to be drawn taut around the core-tooth, the finger being returned to operative position preparatory to the next operative movement of the wire-guide. Of course, in the described action of one of each of the detaining fingers at opposite sides of the work-holder, the guard-fingers 108 perform their normal function in confining the coil-section substantially to the curvature of the core-body *a*.

At the completion of the desired number of turns of the second coil-section, as indicated by the revolution-counter, the machine is again stopped and the stud-pin 28 set opposite the upper notch 33 of the crank-arm 26, thereby adjusting the work-holder actuating device to produce a rocking movement corresponding in amplitude with the spacing apart of five core-teeth, and the machine again set in motion. The third coil-section is formed around the five core-teeth of which the initial tooth is at the center and precisely in the manner described in reference to the second coil-section.

At the completion of the compound coil as thus described, and without severing the wire, the plunger-pins 21 are retracted and the core given a quadrant turn in the work-holder, after which the plunger-pins enter the adjacent apertures $e$ to lock the core-body in position and the machine is again set in operation, but with the main-shaft turning oppositely from its previous direction of motion. By this means, the relative timing of the reciprocatory or oscillatory movements of the work-holder and the traveling movements of the wire-guide is altered, so that in the coöperation of the several parts the coils are formed around the teeth of the adjacent core-section similarly to those previously described, but in the opposite direction, as shown diagrammatically in Fig. 8. In this change in the timing of the work-holder and wire-guide movements, the detaining-finger of each pair previously engaging the wire is ineffective, and in the oscillation of the work-holder the wire is led into engagement with the other finger of the pair. Thus, only one detaining finger of each pair is effective throughout any winding operation in a given direction, and in case the turns should be required all in the same direction, only a single detaining finger would be required upon each side of the work-holder.

Figure 8:
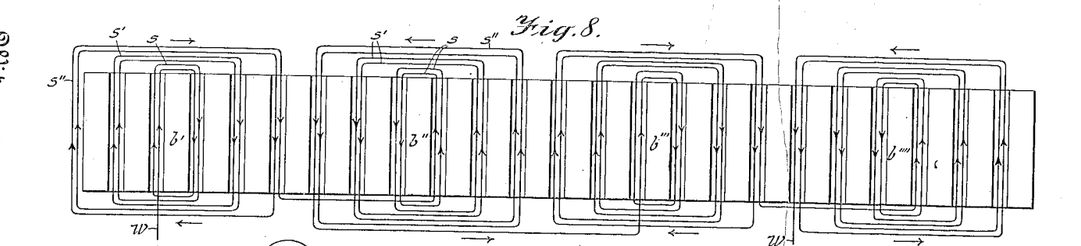
Fig. 8 is a diagram representing a development of the toothed inner periphery of a stator-core with the coils applied thereto, only a few turns of the coil-sections being indicated.

In Fig. 8 the initial or central teeth of the several core-sections to be wound are designated $b'$ $b''$ $b'''$ and $b''''$, and the inner intermediate and outer coil-sections are designated $s$, $s'$ and $s''$, respectively. As indicated by the arrows, the wire $w$ is formed in turns from left to right in the left-hand section of Fig. 1, and is passed therefrom to the inner coil of the second core-section but is formed in turns from right to left, all of the sections being formed of a continuous length of wire with the adjacent coil-sections wound in opposite directions.

It will thus be seen that the rocking and reciprocating carrier 70 72 while moving back and forth in the same plane, in effect, carries the wire-guide or winding member 71 across the rocking work-holder 18 in arched parallel tracks laterally spaced apart and connected at the extremities to form a closed path in which the wire is led around the tooth or teeth of the core, the guard-fingers 108 being disposed within the contour of said path but exterior to the line of traverse of the wire-guide. The detaining fingers 116 are also arranged within the contour of said path across the plane of which at the ends thereof they are designed to reciprocate in curved paths for alternate engagement with and release of the wire while the winding member is at or near the extremity of its line of traverse, the lateral movement of the work-holder bringing the lead of the wire from the core-tooth to the wire-guide across one of the detaining fingers for subsequent release as the wire-guide performs the initial portion of its retractive movement thereafter.

The present improvement obviously differs in principle from ordinary forms of winding mechanism comprising a carrier for a thread or wire and a work-holder sustaining the object to be wound, one of which performs continuous rotary movements relatively to the other, in that, in the present construction, each of the corresponding members is restrained against rotation relatively to the other, each receiving in the present embodiment reciprocatory movements alternately with those of the other. As I believe myself to be the first to devise mechanism of the present type, it is to be understood that the appended claims are to be considered in their broadest sense, the present improvement being adapted for embodiment in mechanism comprising operative elements which differ widely in construction, arrangement and mode of operation.

As before stated, the rotation of the driving shaft in opposite directions causes relative operative movements of the work-holder and winding member or carrier in such manner as to lay the component turns of the coils correspondingly in opposite directions; and this is conveniently effected in practice by belting the driving pulley 6 to a belt-wheel upon the armature-shaft of an electric motor which is reversible in its direction of operation by means of a switch controlling the power supplied to said motor.

According to the present invention, each turn of the coil is adapted to be drawn taut around the tooth or teeth of the core to which it is applied, thereby not only locking the coil in position intermediate the base and enlarged tip or extremity of the tooth or teeth, but effecting a very material saving in the length of wire required to produce the coil as compared with that of the hand operation in which the winding of the coil is completed before application to the core. This not only insures a considerable saving in the cost of production but a higher efficiency of the coil, in that, with a given number of component turns, the reduced length of wire used involves a corresponding reduction in the resistance to flow of current through the same.

Another advantage of the present winding means by which the wire is caused to cling closely to the core-teeth is that the coil extends less beyond the opposite faces of the core and avoids injury due to crowding against the end-bells or bearing brackets of the motor when the parts of the latter are assembled in the finished structure. It is needless to say that the application of the coils to the core simultaneously with the winding of the same involves a very large saving in time and labor over the method at present in use in which such operations are performed separately and the application of the coil is effected by separating and successively applying the individual turns of the coils.

While in its present embodiment the improvement is designed particularly for the winding of annular cores with substantially radial teeth upon their inner faces, it is evidently adapted for winding cores of other types and varieties by suitable modification within the scope of the present invention.

Having thus set forth the nature of the invention, what I claim herein is:—

1. In a core-winding machine, a core-holder, a winding guide, means for producing relative reciprocatory movements between said core-holder and winding guide whereby portions of the wire are laid longitudinally of the core-slots, means for producing relative movements between said holder and guide transversely of and in alternation with said first-mentioned movements whereby certain predetermined core-slots are positioned to receive the wire, and means for causing said first-mentioned means to lay the longitudinally extending portions of the wire entirely within their respective core-slots.

2. In a winding machine, in combination, a work-holder, a reciprocatory winding member, and means for causing a relative traverse of the winding member toward and from the holder and upon the same side thereof in different directions and in different laterally separated arched paths.

3. In a core winding machine, a core-holder, a guide for laying a conductor on the core, said guide being adapted to reciprocate in the same line in both its to and fro movements, and means for producing between the core-holder and guide relative to and fro movements in each of two different angularly related directions and timed to occur so that the guide traverses a simple closed path relative to said core-holder.

4. A core winding machine having a reciprocating guide for laying a conductor in the same line in both its to and fro movements, a holder for supporting the core upon which the conductor is to be laid, and means for producing between the guide and holder relative to and fro movements in each of two angularly related directions, each component of the relative to and fro movements in one of said directions being timed to occur between the beginning and ending of a complete relative to and fro movement in the other direction, whereby the conductor is carried in a closed path about a portion of a core sustained by said holder.

5. In a core-winding machine, a core-holder, a winding guide, means for producing relative reciprocatory movements between said core-holder and winding guide whereby portions of the wire are laid longitudinally of the core-slots, means for producing relative movements between said holder and guide transversely of and in alternation with said first-mentioned movements whereby certain predetermined core-slots are positioned to receive the wire, and a pair of detainers adapted to coöperate alternately with said winding guide during said relative transverse movements.

6. In a winding machine, in combination, means for moving a core alternately in opposite directions in a fixed path, a winding guide, and means for reciprocating said winding guide in a line transversely of the path of movement of said core in timed relation with the reciprocations of said core, whereby a wire is laid in a closed path about a portion of said core.

7. In combination, means for oscillating a core about an axis, a winding guide mounted to reciprocate in a direction lengthwise of the axis of oscillation of the core, and means for imparting to said oscillation producing means and said winding guide operative movements, whereby a wire is carried in a closed path relatively to and around a portion of said core.

8. In combination, a reciprocatory wire-carrier, a core-holder mounted to rock upon an axis substantially parallel with the direction of movement of the wire carrier, and means for imparting to them operative movements whereby a wire is carried in a closed path relatively to and around a portion of a core sustained by said holder.

9. In a winding machine, in combination, a work-holder for carrying a slotted core to be wound, a carrier, and means for imparting to them alternate reciprocatory movements whereby a wire is led by said carrier in a closed path relatively to said holder through different slots of the core.

10. In a winding machine, in combination, a work-holder, a carrier, an actuating shaft, and means permanently connecting said shaft with the carrier and work-holder, respectively, for imparting to them alternate reciprocatory movements whereby the rotation of said shaft causing said carrier to lead a wire in the same line but in opposite directions lays the wire in spaced paths relatively to said holder.

11. In a winding machine, in combination, a work-holder for supporting a core upon which wire is to be wound, a reciprocatory member, a carrier connected with and partaking of the movements of said member, means for imparting to said holder reciprocatory movements transverse to those of said member to bring different parts of the core into position to receive the wire, means for imparting to said carrier reciprocatory movements in a single line transverse to those of said member and said holder, and a wire-guide mounted upon said carrier to lay the wire upon the core.

12. A winding machine having a work-holder for holding and imparting reciprocating movement to a slotted core upon which wire is to be wound, a member adapted for reciprocatory movement transverse to the movements of the core, a wire guide carried by said member, and means for translating the reciprocation of said member into two angularly related movements of the wire guide whereby the wire is led across a surface of the core and laid in the slots thereof.

13. In a winding machine, in combination, a work-holder, a reciprocatory member movable toward and from the same, a rocking carrier mounted thereon, and a wire-guide sustained by said carrier and deriving resultant operative movements from said member and carrier in a path crosswise of said holder.

14. In a winding machine, in combination, a work-holder, a reciprocatory member movable toward and from the same, a rocking carrier mounted upon and deriving reciprocatory movements from said member, a wire-guide sustained by said member, and means for rocking said carrier and comprising a cam and a follower therefor of which the one is mounted upon said carrier and the other is sustained independently of said carrier and its supporting member.

15. In a winding machine, in combination, a work-holder, a reciprocatory member movable toward and from the same, a rocking carrier mounted upon and deriving reciprocatory movements from said member, a wire-guide sustained by said member, and rocking means for said carrier including a member rigidly connected with the carrier and provided with a cam-slot and a stationary stud entering said cam-slot.

16. In a winding machine in combination, a work-holder for carrying a slotted core upon which wire is to be wound, a winding member, means for producing between them relative movements whereby a wire carried across said holder in opposite directions in the same line is laid upon the core in different slots.

17. In a winding machine in combination, a work-holder for carrying a core to be wound with wire, a winding member adapted to move to and fro in the same line, means for producing between the work-holder and member relative reciprocatory movements in different angularly related directions whereby said member crossing the core in different directions in the same line traverses relatively to the core two laterally spaced paths, and means for varying the spacing apart of said paths.

18. In a winding machine, in combination, a work-holder adapted to sustain a core having a circular series of teeth, a winding member, and means for producing between said holder and the winding member relative reciprocatory movements lengthwise of the axis of the series of teeth whereby a wire is carried in a closed path around said teeth upon the same side of said axis.

19. In a winding machine, in combination, a work-holder adapted to sustain a core having a circular series of teeth, a winding member, and means including an adjustable element for producing between said holder and the winding member relative movements in closed paths of different widths whereby a wire is carried around one of said teeth and then around the same tooth and an adjacent tooth or teeth.

20. In a winding machine, in combination, a work-holder, a winding member, means for producing between them relative movements in a closed path comprising successive reciprocatory movements in an arched line of traverse toward and from each other and intermediate lateral movements, and a guard sustained in fixed relation with said holder within the contour of said path but exterior to said line of traverse.

21. In a winding machine, in combination, a work-holder, a winding member, means for producing between them relative movements in a closed path arched intermediate opposite extremities, and guard-fingers adapted to be sustained by a core supported by said holder and disposed adjacent the extremities of said path below its arched intermediate portions.

22. In a winding machine, in combination, a work-holder, a reciprocatory member, a carrier connected with and partaking of the movements of said member, means for imparting to said holder reciprocatory movements transverse to those of said member, means for imparting to said carrier reciprocatory movements transverse to those of said member and said holder, a wire-guide mounted upon said carrier and adapted to traverse a closed path relatively to said holder, and detachable guard-fingers adapted to be readily applied to and temporarily sustained by a core supported by said holder and disposed within the contour of the path of movement of said wire-guide.

23. In a winding machine, in combination, a work-holder, a winding member, means for producing between them relative movements whereby a wire is carried in a closed path relatively to said holder, detaining fingers adapted to engage and hold the wire from the work and holder adjacent opposite ends of said path, and means whereby said fingers are disengaged from the wire.

24. In a winding machine, in combination, a work-holder, a winding member, means for producing between them relative movements whereby a wire is carried in a closed path relatively to said holder, detaining fingers adapted to engage and hold the wire from the work and holder adjacent opposite ends of said path, and means for reciprocating said fingers crosswise of said path to disengage them from the wire.

25. In a winding machine, in combination, a work-holder, a carrier, means for imparting to them alternate reciprocatory movements whereby a wire is led by said carrier in a closed path relatively to said carrier, and detaining fingers arranged in pairs respectively adjacent opposite ends of and each having fingers on opposite sides of said path, the construction being such that the wire may traverse said path in either direction.

26. In a winding machine, in combination, a work-holder, a winding member, means for producing between them relative movements whereby a wire is carried in a closed path relatively to said holder, detaining fingers around which the wire is carried adjacent opposite ends of said path, and common actuating means whereby said fingers are simultaneously actuated.

27. A winding machine having a rotatable reciprocating work-holder for supporting a slotted core, a reciprocating wire guide, and timing means coöperating with the wire guide and work-holder for causing the work-holder to execute one-half of its reciprocatory movement each time the wire guide reaches a predetermined point in its stroke.

28. A winding machine having a wire guide adapted to reciprocate in a single line, a work-holder adapted to carry a slotted core to be wound and to reciprocate in a path disposed at an angle to the path of the wire guide, means for reciprocating the wire guide, and timing mechanism actuated by said means for causing the work-holder to execute one-half of its reciprocatory movement each time the wire guide reaches a predetermined point in its stroke to present different portions of the core to the plane of movement of the wire guide so that the wire being led back and forth in the same line is laid upon the core in different slots.

29. A winding machine having a work-holder adapted to hold a peripherally slotted core, a wire guide adapted to be reciprocated in a plane parallel to the slots of the core, means for reciprocating the work-holder in a plane at an angle to the plane of movement of the wire guide to move different slots into the plane of movement of the wire guide, and mechanism for causing the movement of the work-holder to take place after the wire guide has completed a predetermined portion of each stroke.

30. In a machine for winding circumferentially slotted cores the combination of a work-holder for supporting the core to be wound, a reciprocating wire guide for laying the wire in the core slots, means for reciprocating the work-holder to present two predetermined related slots to the wire guide during a complete reciprocation of said guide, and mechanism for causing said means to move the work-holder when the wire guide completes a portion of each stroke.

31. A machine for winding slotted cores comprising a work-holder adapted to support the core to be wound, a reciprocatory wire guide adapted to lay wire within the core slots, means for reciprocating the work-holder to cause it to present different core slots within the plane of movement of the wire guide, and mechanism for causing said means to function each time the wire guide has completed a stroke.

32. In a winding machine the combination of a work-holder adapted to carry a core to be wound, a wire guide adapted to be reciprocated through a path having two portions thereof disposed at an angle to a third portion whereby the wire is threaded across the core and then moved inwardly upon the core, and means for reciprocating the work-holder in a plane disposed at an angle to the plane of reciprocation of the wire guide so that the wire is laid upon different portions of the core by the movement of the wire guide.

33. In a core winding machine the combination of a wire guide adapted to thread wire in a single line in opposite directions, a core-holder, and means for reciprocating the core-holder in a plane disposed at an angle to the line of the wire.

34. In a winding machine, in combination, a work-holder, a reciprocatory bar movable toward and from the same, a carrier fulcrumed thereon, and a wire-guide sustained by said carrier, of means for producing relative lateral movements between said carrier and the work-holder, and actuating means for said bar comprising a cam, and a vibratory lever operatively connected with said cam and said bar.

35. In a winding machine, in combination, a work-holder, a reciprocatory bar movable toward and from the same, a carrier fulcrumed thereon, and a wire-guide sustained by said carrier, of means for producing relative lateral movements between said carrier and the work-holder, and actuating means for said bar comprising a cam and a vibratory lever mounted upon a fixed fulcrum and operatively connected with said cam and said bar.

36. In a winding machine, in combination, a work-holder, a reciprocatory bar movable toward and from the same, a carrier fulcrumed thereon, and a wire-guide sustained by said carrier, of means for producing relative lateral movements between said carrier and the work-holder, and actuating means for said bar comprising a cam, a plurality of pivotally connected levers one of which is connected with said cam and another of which is connected with said bar.

37. In a winding machine, in combination, a work-holder, a reciprocatory bar movable toward and from the same, a carrier fulcrumed thereon, and a wire-guide sustained by said carrier, of means for producing relative lateral movements between said carrier and the work-holder, and actuating means for said bar comprising a cam, a plurality of pivotally connected levers one of which is connected with said cam and another of which is connected with said bar and each of which is mounted upon a fixed fulcrum.

38. In a winding machine, in combination, a work-holder, a winding guide, means for imparting to them alternate reciprocatory movements each in a single line whereby a wire is led by said winding guide in a closed path relatively to said holder, and a take-up partaking of the reciprocatory movements of said winding guide and adapted to control the slack in the wire leading thereto.

39. In a machine for winding circumferentially slotted cores the combination of a rotatable holder for supporting the core, means for rotatably reciprocating the holder through a predetermined angle, a wire guide adapted to be reciprocated to lay the wire within a core slot, and means acting when the wire guide has completed a portion of its stroke to cause the holder to perform a portion of its reciprocatory movement to present a new slot to the wire guide and effect the laying of the wire between the slots.

40. In a winding machine, in combination, a work-holder, a reciprocatory winding member for carrying a wire around a core sustained by said holder, and actuating means for imparting to said holder movements crosswise of those of said member and comprising a rock-shaft having a lateral arm, a uniformly rocking member provided with a lateral arm, and connections between said lateral arms adjustable toward and from the axis of motion of one of them.

41. In a winding machine, in combination, a work-holder, a supporting rock-shaft therefor provided with a crank-arm, an actuating arm, means for imparting to it uniform vibratory movements, an adjustable connection between said arms whereby oscillatory movements of different amplitude may be imparted to the work-holder from said actuating arm, and a reciprocatory winding member movable longitudinally of the axis of movement of said holder and adapted to carry a wire around a core sustained by said holder.

42. In a winding machine, in combination, a work-holder formed with a segmental channel to receive a circular core having inwardly extending teeth and provided with locking means for engagement with said core, means for oscillating the same on an axis coincident with that of said segmental channel, and a reciprocatory winding member movable longitudinally of said axis and adapted to carry a wire around teeth of said core.

43. In a winding machine, in combination, a work-holder formed with a segmental channel to receive a circular core having inwardly extending teeth and provided with locking means for engagement with said core, means for oscillating the same on an axis coincident with that of said segmental channel, adjusting means for varying the amplitude of oscillation of said holder correspondingly with the spacing apart of said core-teeth, and a reciprocatory winding member movable longitudinally of said axis and adapted to carry a wire around teeth of said core.

44. In a winding machine, in combination, a work-holder, a winding member, means for producing between them relative movements in a closed path in relation to said holder and surrounding a projecting tooth or teeth of a core sustained by said holder, and a guard sustained in fixed relation to said holder within the contour of said path and adapted to confine convolutions of a wire carried by said winding member upon said tooth or teeth during the winding operation.

45. A winding machine having a wire guide adapted to reciprocate to lay wire to and fro in the same line, a work-holder adapted to carry a core to be wound with turns of wire and to reciprocate transversely to the movement of the wire guide so that the wire may be laid on relatively displaced portions of the core, and means for controlling the amount of reciprocations of the work-holder.

46. A winding machine having a wire guide adapted to reciprocate to lay wire to and fro in the same line, a work-holder adapted to carry a core to be wound and to reciprocate transversely to the movement of the wire guide so that the wire may be laid on relatively displaced portions of the core, and means for controlling the amount of reciprocation of the work-holder, to vary the distance between the lays of wire.

47. A winding machine having a holder for holding a slotted core, reciprocating means for laying wire in a slot of the core, and means for reciprocating said holder to present different slots to the reciprocating means, whereby a run of wire may be wound through laterally displaced slots.

48. A winding machine having a holder for holding a slotted core, reciprocating means for laying wire in a slot of the core, means for reciprocating said holder to present different slots to the reciprocating means whereby a run of wire may be wound through laterally displaced slots, and means for varying the amount of reciprocation of the holder.

49. A machine for winding wire upon internally slotted dynamo electric frames, having means for moving the frame and the wire relatively to each other and compounding the said motions to produce a field winding.

50. A machine for winding wire upon internally slotted dynamo electric frames, having means for moving the frame and the wire relatively to each other and compounding said motions, comprising reciprocating and oscillating motions, in such manner as to produce a field winding.

51. A machine for winding wire upon dynamo electric frames, having means for supporting the frame and a wire guide, and means for producing and compounding in said parts, a rectilinear reciprocating motion, an oscillating motion and a radial reciprocating motion in such manner as to produce a field winding of the lap coil type.

52. A machine for winding wire upon internally slotted dynamo electric frames, provided with a winding head, a wire guide, and cams for producing three principal motions, said winding head and said guide arranged to be moved by said cams in a manner that compounds said motions so as to produce a field winding.

53. A machine for winding wire upon dynamo electric frames, provided with driven cams for producing three principal motions involved in field coil winding, a winding head and a wire guide actuated by said cams, whereby said principal motions are compounded so as to produce a field winding.

54. In a machine for winding wire upon a dynamo electric field frame, the combination with driving means, of three driven cams for producing the principal motions involved in field core winding, a winding head, and a wire guide arranged to be actuated by said cams so as to compound said motions to produce in such frame convolutions of a field coil.

55. In a machine for winding wire in the internal slots of a dynamo electric field frame, the combination of a movable support for said frame, a movable wire guide, means for moving said support and said guide relatively to each other whereby the wire is positively drawn down in one slot, formed into an end loop, returned down another slot and formed into another end loop.

56. In a winding machine for motor frames, a winding head therefor comprising the combination with a frame, of an annular member mounted in said frame, means for oscillating said annular member, and of means on said annular member adapted to secure a motor frame thereto in a predetermined manner.

57. In a winding machine for motor frames, the combination with an oscillating winding head, of a wire guide, means for moving the winding head and guide relatively to each other and oscillating said head in a desired manner, and means for adjusting the length of the arc of oscillation whereby coils of any desired width may be wound on motor frames.

58. In a machine for winding wire in the the internal slots of a dynamo electric field frame, the combination of a movable support for said frame, a movable wire guide, and a plurality of timed actuating means for producing relative movement in said support and said guide whereby said guide is elevated during the relative reciprocation of said parts, then lowered during the relative oscillation of said parts, then raised during the return reciprocation and again lowered during the return oscillation.

In testimony whereof I have signed my name to this specification, in the presence of two subscribing witnesses.

FREDERICK DIEHL.

Witnesses:
HENRY J. MILLER,
HENRY A. KORNEMANN, Jr.